United States Patent [19]

Kropa

[11] 4,151,251

[45] Apr. 24, 1979

[54] PELLETIZING PROCESS

[75] Inventor: Gomer E. Kropa, North Reading, Mass.

[73] Assignee: Leesona Corporation, Warwick, R.I.

[21] Appl. No.: 845,412

[22] Filed: Oct. 25, 1977

[51] Int. Cl.² ............................................. B29C 17/06
[52] U.S. Cl. .................................... 264/557; 264/142; 264/169; 264/570
[58] Field of Search ................. 264/142, 157, 167, 93, 264/570, 557, 169; 425/306, 311

[56] References Cited

U.S. PATENT DOCUMENTS

| 3,213,170 | 10/1965 | Erdmenger et al. | 204/142 |
| 3,981,959 | 9/1926 | Cuff | 264/142 |

Primary Examiner—Jay H. Woo

Attorney, Agent, or Firm—Robert J. Doherty

[57] ABSTRACT

An extrusion pelletizing process is disclosed wherein coolant is injected into the stream of thermoplastic material being extruded in such a fashion to interrupt the flow thereof and form discrete material lengths thereof as the material moves through the extrusion die and exits at the other end thereof in the form of pellets. The coolant is permitted to at least partially vaporize upon contact with the material stream and accordingly forms a solidified shell therearound including end portions of adjacent pellets so as to effectively separate such as they pass through the die. Such system enables the formation of discrete material lengths or pellets without the need of conventional cutting apparatus such as knives and the attendant support equipment necessary in their use.

10 Claims, 2 Drawing Figures

PELLETIZING PROCESS

BACKGROUND OF THE INVENTION

This invention relates to the formation of discrete lengths of thermoplastic material in solidified form generally known as pellets. Such pellets are most often formed by the conventional melt extrusion of material through a series of passages. The thus formed strands are cooled as they emerge from the die and cut into individual lengths. Such pellets are utilized as free flowing molding granules for a number of processes such as injection molding and the like.

In order to realize pellet production of consistent size and shape without common occurrences such as fines, smears, and the like, it is normally necessary to utilize rotating knife structures mounted at the face of the die. Much of the size, complexity and accordingly cost required for such equipment is accounted for by the rotating knives and attendant support structure generally utilized in such systems. It would accordingly be desirable if pellets of this type could be produced without the need of cutting knives. Such equipment without such conventional knives would be less expensive and more flexible in operation.

Although applicant is not aware of specific attempts to eliminate knife structures altogether, an attempt to eliminate more conventional knives as by the replacement thereof by a rotary cutoff device is shown in U.S. Pat. 3,003,193 issued Oct. 10, 1961. Therein thermoplastic polymer material is extruded along an extrusion barrel 11 and into a plurality of circumferentially spaced inwardly directed slots 20 positioned about the periphery of a die cutter boby 18. The interior portions of the die cutter body 18 are hollow and the unit is adapted to revolve by action of the screw against a discharge member 10 positioned at the exit end of the die. Coolant is introduced to the interior portions of the die cutter 18 by means of a channel 26, passes into an annular groove 24 and then outwardly into grooves or slots 23 spaced between and radially overlapping the slots 20. The discharge member 10 also includes outlet 25 and upon rotation of the die cutter 18 material passes from the slots 20 intermittently into the outlets 25; the relative rotation between the die cutter body 18 and the discharge member 10 serving to cut or pelletize such material. The resultant pellets are thereafter cooled by the sequential admission of coolant from grooves 23. Thus the sequential and intermittent alignment of the grooves 20,23 with the discharge openings 25 eliminates the need for conventional cutoff device in the formation of the pellets. It is not known whether the eqipment or process disclosed in this patent was ever commercially utilized.

Attention is also directed to a recently introduced unique in die strand-quenching process disclosed in U.S. Pat. No. 3,981,959 issued Sept. 21, 1976. In such patent a system which permits drastically increased pelleting operation efficiencies by means of the introduction of a liquid coolant under pressure into direct contact with the outer surface of polymeric or other materials passing through it is disclosed. As the coolant enters the die orifice, a portion thereof is immediately vaporized to form at least a solidified outer wall of the material surrounding an inner core thereof. The wall of the orifice is simultaneously lubricated by non-vaporizing coolant to facilitate the passage of the material therethrough. Such system also contemplates, although not necessarily so, the subsequent cutting of the resultant strands into discrete material lengths or pellets by knives mounted for rotation with respect to the exit face of the die.

The above cited U.S. Patents and their discussion constitutes Applicant's Prior Art Statement, and in that regard a copy of such patents is filed simultaneously with this application.

SUMMARY OF THE INVENTION

It is accordingly a primary object of the present invention to provide a method for thermoplastic pellets of regular configuration suitable for use as free-flowing molding granules without the use of knives whether such knives are considered in their conventional sense or more broadly as relatively moving elements regardless of their configuration.

A still further object of the invention is the provision of a process for simultaneously forming pellets of the immediately above described type without conventional or non-conventional knife structures while simultaneously cooling the resultant pellets so that upon emergence from the extrusion die they are in a self-sustaining separate form.

A further object of the present invention is the formation of pellets of the above described type wherein the length thereof may be varied by the adjustment of the intermittent coolant flow which serves to simultaneously form and cool such pellets.

These and other objects of the present invention are accomplished by the provision of a novel pelleting apparatus and method comprising heating the thermoplastic material to make it fluid, conveying such heated material to an extrusion die having at least one extrusion orifice in the form of a finite length generally closed passage of significant extent open at opposite ends to sequentially receive a fluid stream of said material under pressure at one end and exit at least partially solidified discrete lengths of said material at the other end thereof, continuously forcing said material through said orifice and outward from the die, intermittently directing at least a portion of a liquid coolant which is immiscible and non-reactive with said material at a pressure sufficiently high to interrupt said fluid stream generally transversely into said orifice at a point wherein said material remains in a fluid state into said fluid stream so as to interrupt and divide said fluid stream into said discrete material lengths, and vaporizing at least part of said coolant immediately upon entrance to said orifice while simultaneously contacting at least those material end portions adjacent said interrupted stream portion so as to cool said end portions and form at least partially solidified end walls of adjacently disposed said discrete lengths of material exiting from said die.

Other objects, features and advantages of the invention shall become apparent as the description thereof proceeds when considered in connection with the accompanying illustrative drawing.

DESCRIPTION OF THE DRAWINGS

In the drawing which illustrates the best mode presently contemplated for carrying out the present invention.

DESCRIPTION OF THE INVENTION

Figure 1:
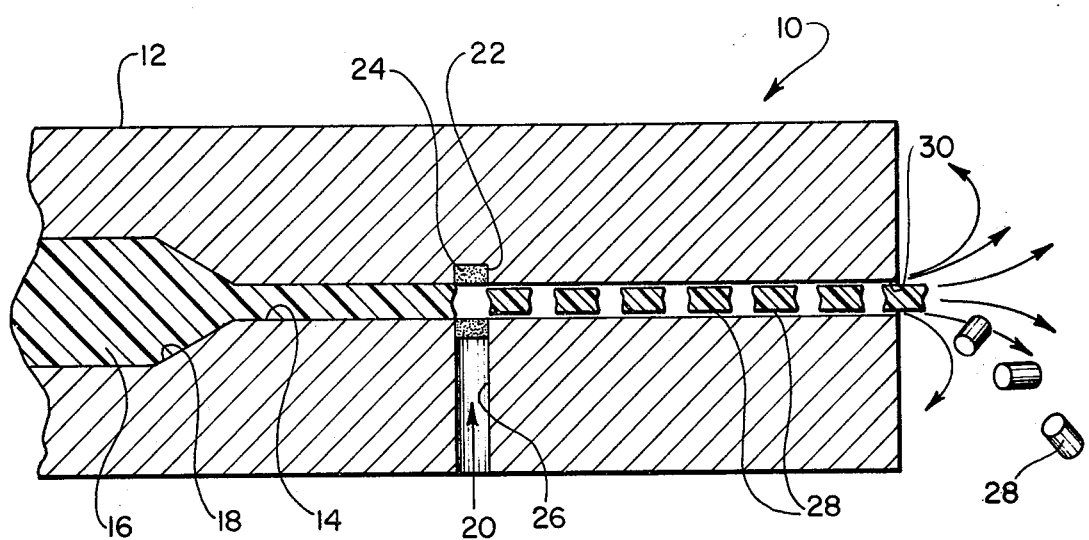
FIG. 1 is a sectional view illustrated in a somewhat schematic fashion the means and method by which pellets are formed by the subject invention.

Turning now to the drawing and in particular FIG. 1 thereof, the device 10 of the present invention includes a die 12 having a multiple number of die orifices 14 arranged generally in a concentric fashion. Thermoplastic material 16 heated to a fluid state is simultaneously forced into the plurality of extrusion orifices 14 as from a common chamber of ring (not shown) as through one or more tapered restrictions 18 in order to reduce the pressure of the material to a point wherein its flow can be interrupted by the introduction of high pressure coolant 20 at a point within the orifice 14. Although it is generally contemplated that the pellets formed by the present invention will be those of thermoplastic polymeric materials, the process and attendant equipment is also useful for the production of pellets or other discrete length shapes of other thermoplastic materials including glass and metal. Also, although the coolant is generally water because of its low cost and availability, other coolants which are generally non-reactive and immiscible with the thermoplastic material being processed, such as nitrogen and methyl alcohol may also be utilized. Also the terms "non-reactive" and "immiscible" as used herein distinguish materials in a quantitative sense, that is, do not exclude materials which could be miscible to an insignificant degree with the material being processed or might be reactive to a non-harmful extent therewith.

Each of the orifices 14 is provided with an annular recess 22 surrounding a limited extent of the bore thereof and into which a ring 24 is inserted. The ring 24 is pervious to the coolant fluid 20 and may be sintered porous metal of open cell construction such as stainless steel or other suitable materials; however other materials and structures may be utilized such as interrelated metal fiber filters and the like. The ring is of a relatively thin extent so that the driving force or pressure under which coolants such as water directed thereto by means of a channel 26 or a suitable manifold structure (not shown) will not be materially reduced. The longitudinal extent of the ring 24 is also relatively slight in dimension so that the coolant will be directed to a localized zone of material 16 passing through the orifice 14. Generally the inner surface of the ring 24 forms a smooth continuation with the walls of the orifice 14. At periodic intervals, timed in accordance with the flow of material 16 through the die 12, coolant 20 is pulsed under a pressure sufficiently high to interrupt the flow material 16 adjacent the ring 24, and in this fashion effectively cut off or separate such material flow into a series of individual pellets 28. Inasmuch as the material within the orifices 14 is in a hot condition, at least a portion of the coolant immediately evaporates since the exit end 30 of each orifice 14 is at a materially lower pressure and generally at atmospheric pressure. The system may thus be considered hydraulically open. Such phase change from liquid to gas, as in the case of water coolant, serves to immediately withdraw a great deal of heat from those surfaces of the material in contact with the coolant, namely the adjacent end portions of an already formed pellet 28 and the front surface of the emerging material 16, due to the heat of evaporation of the water. As a result of this, at least those surfaces of the plastic become somewhat solidified. Furthermore, the coolant is forced around the resultant pellets 28, that is, between the inner wall surfaces of the orifice 14 and the outer surfaces of the pellets so that additional cooling immediately takes place and a somewhat solidified shell of hardened plastic material is formed about each pellet 28. The remaining portions of the pellet may remain at a substantially higher temperature than at the outer surfaces thereof due to the inherent insulating effect of the hardened shell; however, this normally does not present a problem since pellets of this type are conventionally additionally cooled upon emergence of the die exit portion 30 as by an additional coolant spray or the like prior to subsequent processing and classification. In addition, the continuing pulsing of the coolant assures that such is constantly being forced under pressure through the walls of the orifices with the result that a continuous film of water surrounds the interior walls of the extrusion orifices 14 and acts as a lubrication for the discrete lengths or rods of plastic being forced therethrough. Naturally, the amount of coolant which does not assume a phase change and is available as a lubricant depends on many factors such as the coolant pressure and temperature of the material stream 16. Upon emerging from the die, the material stream 16 has accordingly been formed by the pulsating action of the coolant 20 into a series of discrete length articles or pellets 28 without the necessity of cutting a continual strand thereof as it emerges in other processes from the exit orifice 30. This results in a material savings of attendant equipment and space resulting in a lower cost process which has attendant flexibility as to the length of the pellets 28 formed by increasing or reducing the time span between coolant pulses. Generally the coolant is pulsed by means of the intermittent pumping thereof by known pumping techniques. However, the same pulsating effect may be achieved by a constant pumping action in combination with valve means (not shown) which serve to open and close access to the pressure or outer side of the ring 24 in a timed sequence.

Figure 2:
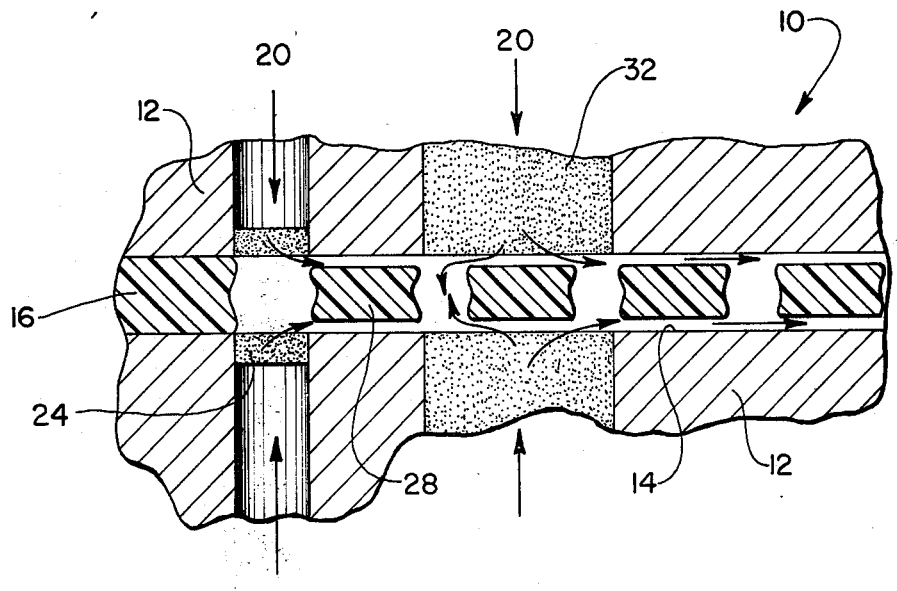
FIG. 2 is a somewhat similar view on an enlarged scale illustrating a modified form thereof.

Turning now to FIG. 2 of the drawing, an alternate construction of the invention is shown wherein in addition to the ring 24 which serves as the primary introduction of coolant 20 so as to interrupt the flow of materials 16 so as to form individual pellets 28, an additional ring 32 is utilized downstream from the original ring 24. Such ring 32 may be of similar construction as the ring 24 but normally is of a larger longitudinal extent and it is utilized primarily to introduce additional coolant around the outside surfaces of the already formed pellets 28 as they progress through the orifice 14. The pressure at which the coolant is introduced through the additional ring 32 may be substantially less than that of the original ring 24 since it is not necessary that the pressure be high enough to interrupt the flow of material 16 at this point and only is necessary to achieve additional cooling effect and maintain a separation between the already formed pellets 28. Accordingly, its thickness may be substantially greater than ring 24 inasmuch as it is not necessary to insure against a pressure dampening effect which could be caused by a sufficiently thick ring in those cases wherein the coolant flow is pulsed as by a pump.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of forming thermoplastic material in discrete lengths thereof comprising heating the thermoplastic material to make it fluid, conveying such heated material to an extrusion die having at least one extrusion orifice in the form of a finite length generally closed passage of significant extent open at opposite ends to sequentially receive a fluid stream of said material under pressure at one end and exit at least partially solidified discrete lengths of said material at the other end thereof, continuously forcing said material through said orifice and outwardly from the die at said exit end thereof, intermittently directing at least a portion of a liquid coolant which is immiscible and non-reactive with said material, at a pressure sufficiently high to interrupt said fluid stream generally transversely into said orifice at a point remote from said exit die end wherein said material remains in an essentially fluid state into said fluid stream so as to interrupt and divide said fluid stream into said discrete material lengths, and vaporizing at least part of said coolant immediately upon entrance to said orifice while simultaneously contacting at least those material end portions adjacent said interrupted stream portion so as to cool said end portions and form at least partially solidified end walls of adjacently disposed said discrete lengths of material exiting from said die.

2. The method of claim 1, wherein a coolant portion is directed between said material and said closed passage, vaporizing a part of said coolant portion to form at least a solidified outer material shell surrounding an inner core of material while simultaneously lubricating the wall of said passage by said non-vaporized coolant portion to facilitate passage of said material therethrough.

3. The method of claim 2, said coolant portion directed between said material and said passage wall being an additional amount thereof.

4. The method of claim 3, including introducing said additional coolant at a point in said passage removed from the point at which said interrupting material stream coolant is introduced.

5. The method of claim 4, wherein said additional coolant is continuously introduced.

6. The method of claim 5, wherein such additional coolant is introduced downstream from the introduction point of said interrupting material stream coolant.

7. The method of claim 1, wherein said coolant flow is pulsed so as to form separated discrete material lengths in said passage.

8. The method of claim 1, wherein said liquid coolant is superheated water and said material is a resinous plastic.

9. The method as set forth in claim 1, wherein said orifice passage is defined in part by a fluid pervious wall portion proximate the upstream portion of said passage and wherein said liquid coolant is directed into contact with said material through said fluid pervious wall.

10. A method according to claim 1, including the steps of substantially filling said orifice with said material and forcing said material therethrough, and maintaining the material with the cross-sectional configuration of said orifice as said material moves outward from said orifice.

* * * * *